United States Patent
Hickey et al.

(10) Patent No.: US 12,315,903 B2
(45) Date of Patent: May 27, 2025

(54) THERMAL PROPAGATION MITIGATION OF VEHICLE COMPONENTS

(71) Applicant: GM GLOBAL TECHNOLOGY OPERATIONS LLC, Detroit, MI (US)

(72) Inventors: Ryan Patrick Hickey, Austin, TX (US); Alexander M. Bilinski, Avoca, MI (US); Phillip Daniel Hamelin, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 726 days.

(21) Appl. No.: 17/562,084

(22) Filed: Dec. 27, 2021

(65) Prior Publication Data

US 2023/0207917 A1    Jun. 29, 2023

(51) Int. Cl.
*B60K 1/04* (2019.01)
*B62D 25/20* (2006.01)
*H01M 10/625* (2014.01)
*H01M 10/6566* (2014.01)
*B60K 1/00* (2006.01)

(52) U.S. Cl.
CPC .............. *H01M 10/625* (2015.04); *B60K 1/04* (2013.01); *B62D 25/20* (2013.01); *H01M 10/6566* (2015.04); *B60K 2001/005* (2013.01); *B60K 2001/0438* (2013.01); *H01M 2220/20* (2013.01)

(58) Field of Classification Search
CPC ...... B60K 1/04; B60K 2001/005; B60K 1/02; H01M 10/6566; H01M 10/625; H01M 2220/20; B62D 25/20; F01N 1/16; F01N 1/161; F01N 1/163; F01N 1/165; F01N 1/166; F01N 13/082
See application file for complete search history.

(56) References Cited

U.S. PATENT DOCUMENTS

| 5,176,317 A * | 1/1993 | Park | G05D 23/185 |
| | | | 236/86 |
| 10,312,490 B2 * | 6/2019 | Maguire | H01M 50/333 |
| 2002/0139114 A1 * | 10/2002 | Dickau | F01N 13/008 |
| | | | 60/288 |
| 2006/0166081 A1 * | 7/2006 | Sauter | H01M 50/35 |
| | | | 429/88 |
| 2008/0280192 A1 * | 11/2008 | Drozdz | B60L 3/0046 |
| | | | 700/297 |

(Continued)

*Primary Examiner* — Jason D Shanske
*Assistant Examiner* — James J Triggs
(74) *Attorney, Agent, or Firm* — CANTOR COLBURN LLP

(57) ABSTRACT

A thermal management system for one or more components of a vehicle includes one or more heat generating components, and one or more compartments to contain the one or more heat generating components. One or more vent openings are located in the one or more compartments. Each vent opening of the one or more vent openings are closed by a thermally active material, such that when exhaust gas from the one or more components interacts with the thermally active material, the one or more vent openings are opened allowing for removal of the exhaust gas from the compartment. One or more vent manifolds are located adjacent to the one or more vent openings. The one or more vent manifolds are configured to direct the exhaust gas to ambient through one or more manifold openings in the one or more vent manifolds.

20 Claims, 3 Drawing Sheets

(56) References Cited

U.S. PATENT DOCUMENTS

2016/0020447 A1* 1/2016 Janarthanam ....... H01M 10/625
180/68.5
2019/0053330 A1* 2/2019 Everly ................... F01N 9/005
2022/0242248 A1* 8/2022 Boyer .................. H01M 10/48

* cited by examiner

THERMAL PROPAGATION MITIGATION OF VEHICLE COMPONENTS

INTRODUCTION

The subject disclosure relates to exhausting of thermal energy from vehicle components, such as from modules of rechargeable energy storage systems (RESSs) of a vehicle.

In some vehicles, one or more underfloor storage compartments are defined, and one or more vehicle components may be located in the underfloor storage compartments, including, for example, rechargeable energy storage systems (RESS's), such as battery modules, or other components such as propulsion system storage tanks. The battery modules in some instances may require venting of thermal energy via exhaust gases to prevent or mitigate overheating of the battery packs to prevent damage to the battery packs and/or other components of the vehicle. Currently, the exhaust gases are typically removed via vents in the sidewalls and front and rear walls of the compartment. In doing so, the exhaust gases must often be passed through or around other battery modules, and over other vehicle components thus transferring thermal energy to those other modules, rather than removing the thermal energy from the compartment.

SUMMARY

In one embodiment, a thermal management system for one or more components of a vehicle includes one or more heat generating components, and one or more compartments to contain the one or more heat generating components. One or more vent openings are located in the one or more compartments. Each vent opening of the one or more vent openings are closed by a thermally active material, such that when exhaust gas from the one or more components interacts with the thermally active material, the one or more vent openings are opened allowing for removal of the exhaust gas from the compartment. One or more vent manifolds are located adjacent to the one or more vent openings. The one or more vent manifolds are configured to direct the exhaust gas to ambient through one or more manifold openings in the one or more vent manifolds.

Additionally or alternatively, in this or other embodiments the thermally active material is one of a thermal tape, a wax plug or solder.

Additionally or alternatively, in this or other embodiments a component vent is located in the one or more components to direct the exhaust gas toward the one or more vent openings.

Additionally or alternatively, in this or other embodiments the one or more vent manifolds include one or more rails secured to the one or more compartments.

Additionally or alternatively, in this or other embodiments the thermally active material seals the one or more compartments.

Additionally or alternatively, in this or other embodiments the one or more manifold openings are one of circular, oval, elliptical or polygonal.

In another embodiment, a floor assembly of a vehicle includes a floor panel, and an underfloor tray located in a spaced apart relationship from the floor panel. The floor panel and the underfloor tray define one or more underfloor compartments therebetween. One or more heat generating components are located in the one or more underfloor compartments. One or more vent openings are located in the one or more underfloor compartments. Each vent opening of the one or more vent openings are closed by a thermally active material, such that when exhaust gas from the one or more heat generating components interacts with the thermally active material, the one or more vent openings are opened allowing for removal of the exhaust gas from the one or more underfloor compartments. One or more vent manifolds are located adjacent to the one or more vent openings. The one or more vent manifolds are configured to direct the exhaust gas to ambient through one or more manifold openings in the one or more vent manifolds.

Additionally or alternatively, in this or other embodiments the thermally active material is one of a thermal tape, a wax plug or solder.

Additionally or alternatively, in this or other embodiments a component vent in the one or more heat generating components directs the exhaust gas toward the one or more vent openings.

Additionally or alternatively, in this or other embodiments the one or more vent manifolds comprise one or more rails secured to the one or more underfloor compartments.

Additionally or alternatively, in this or other embodiments the one or more vent manifolds are defined between the underfloor tray and the one or more vent rails.

Additionally or alternatively, in this or other embodiments the one or more rails are welded to the underfloor tray.

Additionally or alternatively, in this or other embodiments the one or more rails extend in a vehicle forward to aft direction along the underfloor tray.

Additionally or alternatively, in this or other embodiments the thermally active material seals the one or more underfloor compartments.

Additionally or alternatively, in this or other embodiments the one or more heat generating components includes one or more battery packs.

Additionally or alternatively, in this or other embodiments the one or more manifold openings are one of circular, oval, elliptical or polygonal.

Additionally or alternatively, in this or other embodiments the one or more vent manifolds are located vertically below the underfloor tray, and the underfloor tray is located vertically under the one or more heat generating components.

In yet another embodiment, a method of venting exhaust gas from a floor assembly of a vehicle includes flowing exhaust gas from one or more heat generating components of the floor assembly toward one or more closed vent openings in an underfloor tray of the floor assembly, dissipating a thermally active material covering the one or more vent openings, thus opening the one or more vent openings by contact with the exhaust gas, directing the exhaust gas through the one or more vent openings and into a vent manifold, and venting the exhaust gas to ambient through one or more manifold openings in the vent manifold.

Additionally or alternatively, in this or other embodiments the thermally active material is one of a thermal tape, a wax plug or solder.

Additionally or alternatively, in this or other embodiments the one or more heat generating components includes one or more battery packs.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses.

Figure 1:
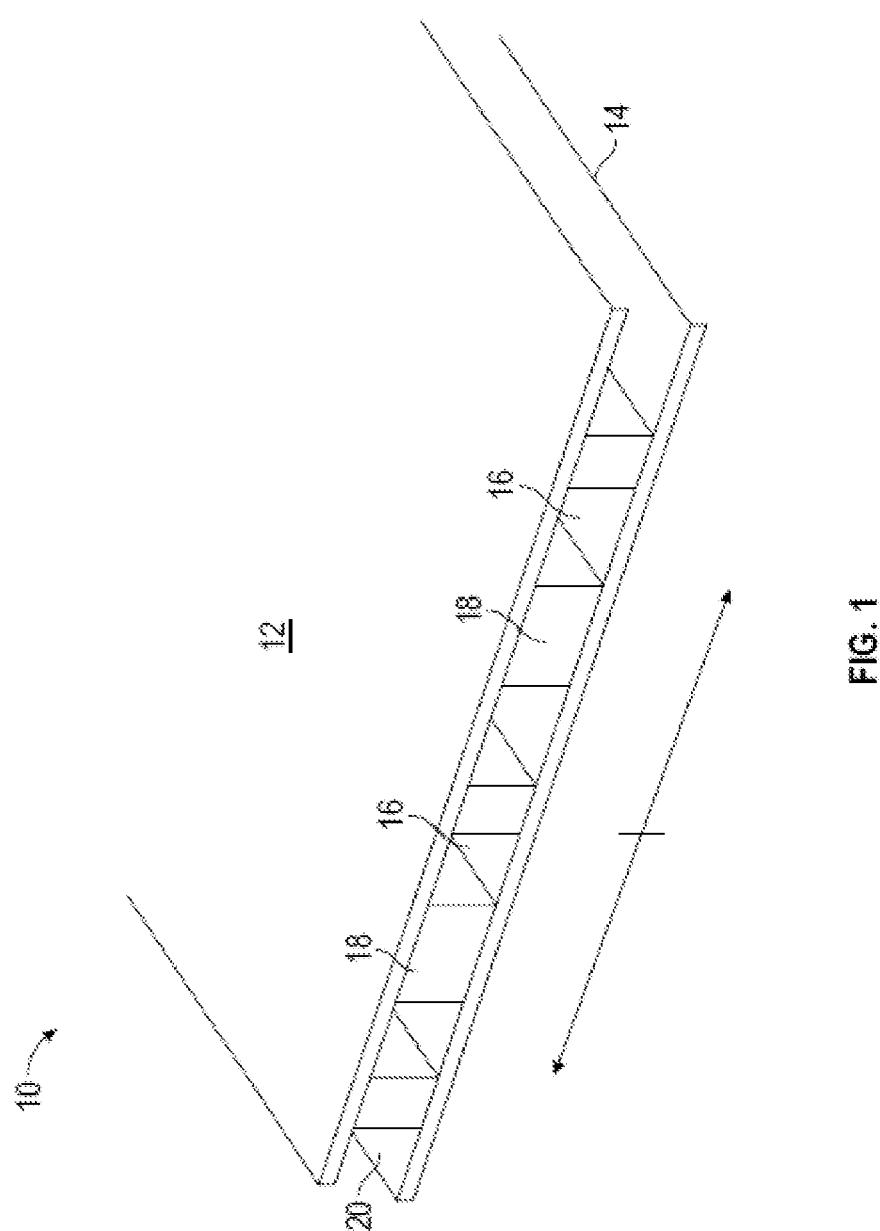
FIG. 1 is a perspective view of an embodiment of a floor assembly of a vehicle.

In accordance with an exemplary embodiment, a floor assembly 10 for a vehicle is illustrated in FIG. 1. While the disclosure is presented in the context of the floor assembly 10, one skilled in the art will readily appreciate that the subject matter of the present disclosure may be applied to other applications and component assemblies. The floor assembly 10 includes a floor panel 12 and an underfloor tray 14 vertically below and spaced apart from the floor panel 12. One or more underfloor compartments 16 are defined between the floor panel 12 and the underfloor tray 14. A variety of vehicle components, such as battery packs 18 or other propulsion system components, may be installed in the underfloor compartments 16.

Figure 2:
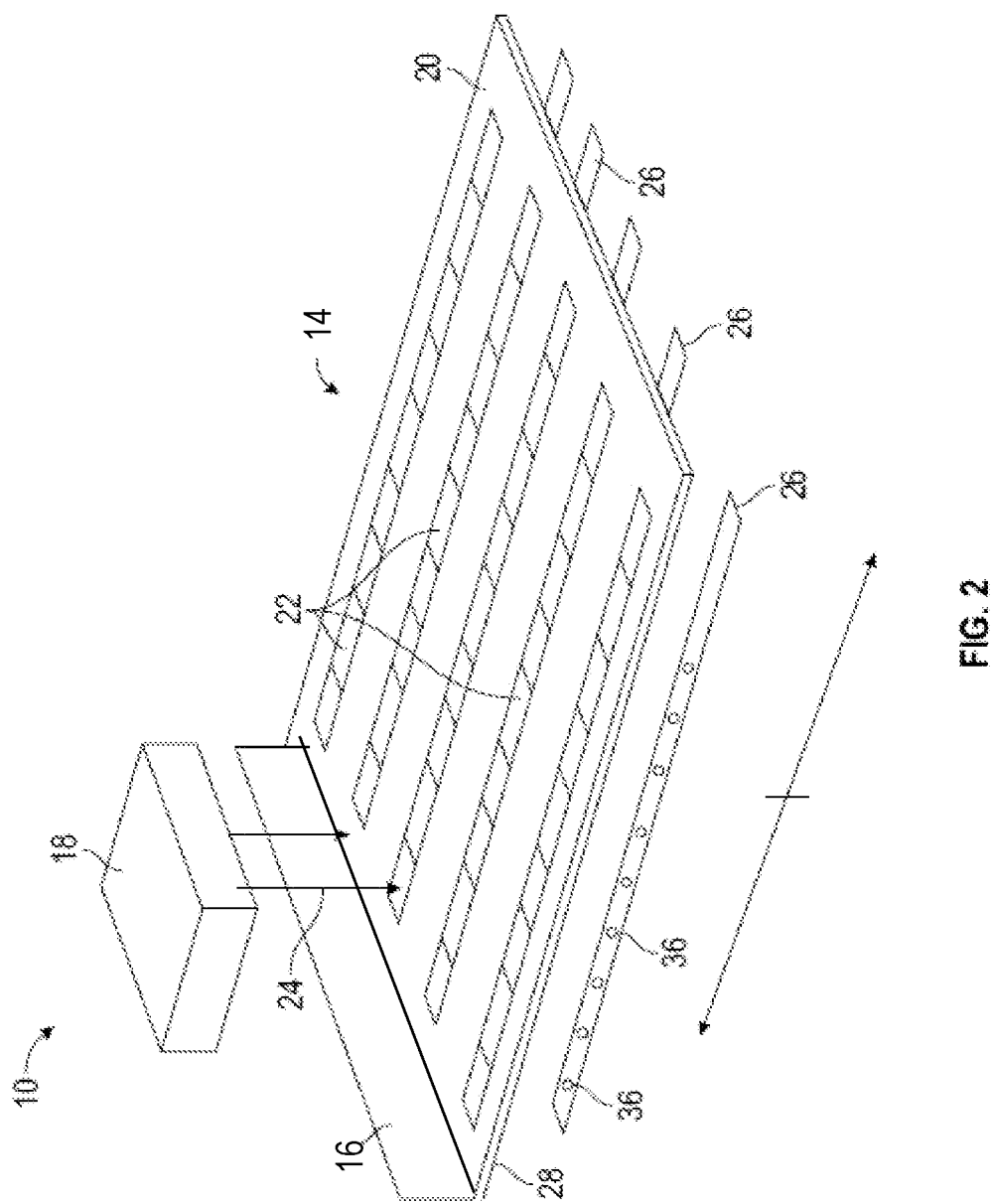
FIG. 2 is a partially disassembled view of an embodiment of a floor assembly of a vehicle.

Referring now to FIG. 2, illustrated is a partially disassembled view of an embodiment of a floor assembly 10. The one or more battery packs 18 are mounted to the underfloor tray 14 at a top surface 20 of the underfloor tray 14. The underfloor tray includes a plurality of vent openings 22 formed therein, which allow exhaust gas 24 from the one or more battery packs 18 to be vented out of the underfloor compartment 16. In some embodiments, the one or more battery packs 18 are arrayed along a forward to aft direction of the underfloor tray 14. Additionally, in some embodiments, the battery packs 18 include pack vents 40, shown in FIG. 3, which direct the exhaust gas 24 directly into the vent openings 22.

Figure 3:
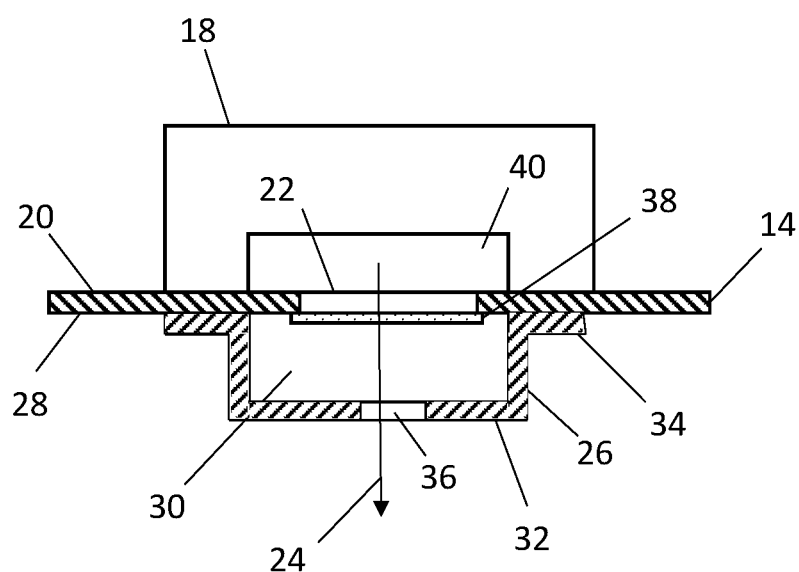
FIG. 3 is a cross-sectional view of an embodiment of a floor assembly of a vehicle.

A plurality of skid rails 26 extending in forward to aft direction as shown are secured to a bottom surface 28 of the underfloor tray 14, opposite the top surface 20. In some embodiments, the skid rails 26 are welded to the bottom surface 28. Referring now to FIG. 3, the skid rails 26 are configured to define a vent manifold 30 between the skid rail 26 and the underfloor tray 14. Exhaust gas 24 is vented from the underfloor compartments 16 through the vent openings 22 in the underfloor tray 14 and into the vent manifold 30.

To define the vent manifold 30, the skid rails 26 each have a rail body 32 and a rail flange 34 that extends around a perimeter of the rail body 32. The rail flange 34 is vertically offset from the rail body 32 such that when the skid rail 26 is welded to the underfloor tray 14 via the rail flange 34, the vent manifold 30 is defined as a vertical spacing between the rail body 32 and the underfloor tray 14. Referring again to FIG. 2, the vent rail 26 includes a plurality of rail openings 36 in the rail body 32. When exhaust gas 24 proceeds into the vent manifold 30, the rail openings 36 allow for venting of the accumulated exhaust gas 24 from the vent manifold 30 and away from the vehicle. In some embodiments, the rail openings 36 are circular such as illustrated in FIG. 2, but may alternatively be other shapes such as oval, elliptical or polygonal.

During normal operation, the underfloor compartments 16 are sealed from the vent manifold 30, by filling or covering the vent openings 22 with a thermally active material 38, thus closing and sealing the vent openings 22. In some embodiments, the thermally active material 38 is, for example, a thermal tape, wax plugs or solder. The thermally active material 38 utilized must be able to allow the floor assembly 10 to pass a required leak check, ensuring sealing of the interior of the underfloor compartments 16. When sufficient hot exhaust gas 24 is expelled from the battery packs 18 to the vent openings 22, the temperature of the exhaust gas 24 melts or otherwise dissipates the thermally active material 38, thus opening the vent openings 22. Opening of the vent openings 22 allows the exhaust gas 24 to proceed to the vent manifold 30 and out to ambient through the rail openings 36. The disclosed configurations including the vent openings, the vent manifold 30 and the thermally active material 38 allows for effective removable of the exhaust gas 24 from the floor assembly 10, particularly in a directional manner thus better protecting vehicle occupants in the event of a thermal release from the battery packs 18.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A thermal management system for one or more components of a vehicle, comprising:
    one or more heat generating components;
    one or more compartments to contain the one or more heat generating components;
    one or more vent openings disposed in the one or more compartments, each vent opening of the one or more vent openings closed by a thermally active material extending across the one or more vent openings, such that when exhaust gas from the one or more components interacts with the thermally active material to melt or dissipate the thermally active material, the one or more vent openings are opened allowing for removal of the exhaust gas from the one or more compartments; and
    one or more vent manifolds disposed adjacent to the one or more vent openings, the one or more vent manifolds configured to direct the exhaust gas to ambient through one or more manifold openings in the one or more vent manifolds;
    wherein the one or more heat generating components are one or more battery packs each including one or more pack vents through which exhaust gas is vented.

2. The thermal management system of claim 1, wherein the thermally active material is one of a thermal tape, a wax plug or solder.

3. The thermal management system of claim 1, wherein the one or more pack vents direct the exhaust gas toward the one or more vent openings.

4. The thermal management system of claim 1, wherein the one or more vent manifolds comprise one or more rails secured to the one or more compartments.

5. The thermal management system of claim 1, wherein the thermally active material seals the one or more compartments.

6. The thermal management system of claim 1, wherein the one or more manifold openings have a shape that are one of circular, oval, elliptical or polygonal.

7. A floor assembly of a vehicle, comprising:
a floor panel;
an underfloor tray disposed in a spaced apart relationship from the floor panel, the floor panel and the underfloor tray defining one or more underfloor compartments therebetween;
one or more heat generating components disposed in the one or more underfloor compartments;
one or more vent openings disposed in the one or more underfloor compartments, each vent opening of the one or more vent openings closed by a thermally active material extending across the one or more vent openings, such that when exhaust gas from the one or more heat generating components interacts with the thermally active material to melt or dissipate the thermally active material, the one or more vent openings are opened allowing for removal of the exhaust gas from the one or more underfloor compartments;
one or more vent manifolds disposed adjacent to the one or more vent openings, the one or more vent manifolds configured to direct the exhaust gas to ambient through one or more manifold openings in the one or more vent manifolds;
wherein the one or more heat generating components are one or more battery packs each including one or more pack vents through which exhaust gas is vented.

8. The floor assembly of claim 7, wherein the thermally active material is one of a thermal tape, a wax plug or solder.

9. The floor assembly of claim 7, wherein the one or more pack vents direct the exhaust gas toward the one or more vent openings.

10. The floor assembly of claim 7, wherein the one or more vent manifolds comprise one or more rails secured to the one or more underfloor compartments.

11. The floor assembly of claim 10, wherein the one or more vent manifolds are defined between the underfloor tray and the one or more rails.

12. The floor assembly of claim 10, wherein the one or more rails are welded to the underfloor tray.

13. The floor assembly of claim 10 wherein the one or more rails extend in a vehicle forward to aft direction along the underfloor tray.

14. The floor assembly of claim 7, wherein the thermally active material seals the one or more underfloor compartments.

15. The floor assembly of claim 7, wherein the one or more manifold openings have a shape that are one of circular, oval, elliptical or polygonal.

16. The floor assembly of claim 7, wherein the one or more vent manifolds are disposed vertically below the underfloor tray, and the underfloor tray is disposed vertically under the one or more heat generating components.

17. A method of venting exhaust gas from a floor assembly of a vehicle, comprising:
flowing exhaust gas from one or more heat generating components of the floor assembly toward one or more closed vent openings in an underfloor tray of the floor assembly;
dissipating a thermally active material extending across the one or more vent openings, thus opening the one or more vent openings by contact with the exhaust gas;
directing the exhaust gas through the one or more vent openings and into a vent manifold; and
venting the exhaust gas to ambient through one or more manifold openings in the vent manifold;
wherein the one or more heat generating components are one or more battery packs each including one or more pack vents through which exhaust gas is vented.

18. The method of claim 17, wherein the thermally active material is one of a thermal tape, a wax plug or solder.

19. The method of claim 17, wherein: the one or more heat generating components are disposed in one or more underfloor compartments of the floor assembly; the one or more vent openings are disposed at the one or more underfloor compartments; and the vent manifolds comprises one or more rails secured to the one or more underfloor compartments.

20. The method of claim 19, wherein the vent manifolds is defined between the underfloor tray and the one or more rails.

* * * * *